(12) United States Patent
Klein (10) Patent No.: US 7,792,934 B2
(45) Date of Patent: Sep. 7, 2010

(54) LOADING OF SERVER-STORED USER PROFILE DATA

(75) Inventor: Helge Klein, Cologne (DE)

(73) Assignee: Citrix Systems International GmbH (IE)

(*) Notice: Subject to any disclaimer, the term of this patent is extended or adjusted under 35 U.S.C. 154(b) by 235 days.

(21) Appl. No.: 11/968,361

(22) Filed: Jan. 2, 2008

(65) Prior Publication Data
US 2009/0172160 A1 Jul. 2, 2009

(51) Int. Cl.
G06F 15/177 (2006.01)
G06F 15/173 (2006.01)

(52) U.S. Cl. ...................... 709/222; 709/225

(58) Field of Classification Search .......... 709/223–225
See application file for complete search history.

(56) References Cited

U.S. PATENT DOCUMENTS

| | | | |
|---|---|---|---|
| 6,038,596 A | 3/2000 | Baldwin et al. | |
| 6,157,953 A | 12/2000 | Chang et al. | |
| 6,473,794 B1 | 10/2002 | Guheen et al. | |
| 6,519,571 B1 | 2/2003 | Guheen et al. | |
| 6,536,037 B1 | 3/2003 | Guheen et al. | |
| 6,606,744 B1 | 8/2003 | Mikurak | |
| 6,615,166 B1 | 9/2003 | Guheen et al. | |
| 6,671,818 B1 | 12/2003 | Mikurak | |
| 6,721,713 B1 | 4/2004 | Guheen et al. | |
| 6,771,290 B1 * | 8/2004 | Hoyle ..................... 715/745 | |
| 6,850,252 B1 | 2/2005 | Hoffberg | |
| 6,859,212 B2 | 2/2005 | Kumar et al. | |
| 6,912,582 B2 | 6/2005 | Guo et al. | |
| 6,954,736 B2 | 10/2005 | Menninger et al. | |
| 6,957,186 B1 | 10/2005 | Guheen et al. | |
| 7,013,290 B2 | 3/2006 | Ananian et al. | |
| 7,092,370 B2 | 8/2006 | Jiang et al. | |
| 7,124,101 B1 | 10/2006 | Mikurak | |
| 7,130,807 B1 | 10/2006 | Mikurak | |
| 7,149,698 B2 | 12/2006 | Guheen et al. | |
| 7,165,041 B1 | 1/2007 | Guheen et al. | |
| 7,200,804 B1 | 4/2007 | Khavari et al. | |
| 2003/0233544 A1 | 12/2003 | Erlingsson | |
| 2005/0097008 A1 | 5/2005 | Ehring et al. | |
| 2007/0300185 A1 | 12/2007 | Macbeth et al. | |

* cited by examiner

*Primary Examiner*—Wing F Chan
*Assistant Examiner*—David Yi
(74) *Attorney, Agent, or Firm*—Choate, Hall & Stewart LLP (57) ABSTRACT

One or more computer-implemented methods provided by computer-readable media for providing and loading user profile data from a server computer system to a client computer system may be used together with the server and client computer systems. The client computer system may be caused to initiate a login process for a user on the client computer system and to send login information to the server during the login process. After reception of the login information from the client, the server evaluates the received login information to obtain user information corresponding to a user identified in the login information. Based on the obtained user information, the server finds user profile data stored on the server computer system. Finally, metadata relating to the user profile data may be determined by the client computer system by pulling corresponding data from the server computer system.

18 Claims, 5 Drawing Sheets

LOADING OF SERVER-STORED USER PROFILE DATA

BACKGROUND

1. Field of the Invention

The present invention generally relates to a user login process and, in particular, relates to loading of server-stored user profile data.

2. Related Art

In recent years, the amount of client-server systems has increased considerably. Nowadays, nearly all offices provide a computer system having at least one server and a plurality of client computer systems which are used by the employees. The server computer systems provide access to centrally-stored data, such as slide decks, documents, emails, etc. A further advantage of such client-server systems is the possibility of storing user profile data on a server. A user, such as an employee, is therefore given the possibility to log into the client-server system from any client computer system and can instantaneously work on the client computer system having computer properties and attributes set to the profile which is specific for and familiar to the user. In addition, more and more private households are having client-server solutions installed at home wherein multiple clients have access to centrally-stored data such as digital photographs, music, videos and so on.

These client-server computer systems provide a plurality of advantages for every user, and in particular for nomadic users not working at the same place or office all the time. However, even modern client-server computer systems still have drawbacks, for example arising from a low network bandwidth, or for client computer systems having a small computing power.

SUMMARY OF THE INVENTION

A computer-readable medium is provided which may facilitate storing computer-executable instructions causing a client computer system to perform a method of loading user profile data from a server computer system to the client computer system. The loading of user profile data may include the initiation of a login process for a user on the client computer system and the sending of login information to the server computer system during the login process. Finally, metadata relating to the user profile data is determined.

According to an embodiment, there is provided a computer-readable medium storing other computer-executable instructions causing the server computer system to perform a method of providing user profile data from the server computer system to a client computer system. The server computer system may receive login information from the client computer system and evaluates the received login information to obtain user information corresponding to a user identified in the login information. Further, user profile data stored on the server computer system may be found based on the obtained user information. The server computer system may then provide data relating to the user profile data to the client computer system to determine metadata relating to the user profile data.

In another embodiment, a client computer system includes a processor, a memory operatively coupled to the processor, a network interface configured to establish a connection to another computer system via a network and a login module. The login module is configured to allow a user to log in to the client computer system, and to send login information to a server computer system during the login process. Further, the client computer system includes a service module executed by the processor and configured to determine metadata relating to the user profile data.

In a further embodiment, a server computer system for maintaining user profile data includes a processor, a memory operatively coupled to the processor, a network interface configured to establish a connection to another computer system via a network and a user profile store configured to store at least one user profile. The server computer system further includes a service module executed by the processor and configured to request user profile data from the user profile store. Moreover, the service module is configured to provide, via the network link, data relating to the requested user profile data to a client computer system to determine metadata relating to the user profile data.

In a further embodiment, a method of loading user profile data from a server computer system to a client computer system is provided. The loading of user profile data may include the initiation of a login process for a user on the client computer system and the sending of login information to the server computer system during the login process. Finally, metadata relating to the user profile data is then determined.

According to another embodiment, there is provided a method of providing user profile data from a server computer system to a client computer system. The server computer system may receive login information from the client computer system and evaluates the received login information to obtain user information corresponding to a user identified in the login information. Further, user profile data stored on the server computer system may be found based on the obtained user information. The server computer system is then caused to provide data relating to the user profile data to the client computer system to determine metadata relating to the user profile data.

BRIEF DESCRIPTION OF THE DRAWINGS

The accompanying drawings are incorporated into and form a part of the specification of the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION

The illustrative embodiments of the present invention will be described with reference to the figure drawings wherein like elements and structures are indicated by like reference numbers.

Figure 1A:
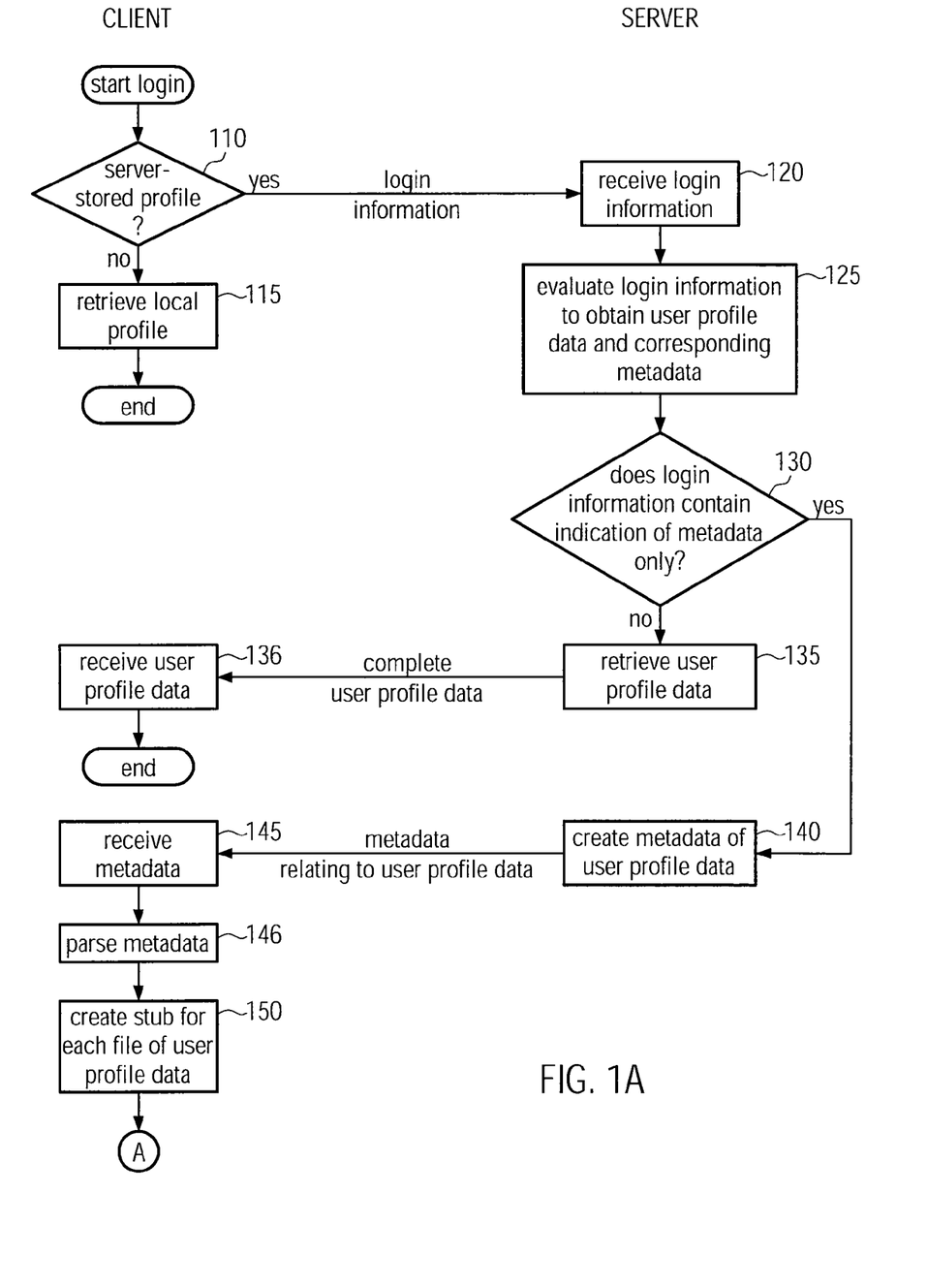
FIG. 1A is a flow chart illustrating steps of a login process on a client computer system connected to a server computer system.

Referring firstly to FIG. 1 which provides a flow chart illustrating the steps of a login process. In particular, the steps performed on a client as well as on a server are depicted.

In general, a user such as an employee or household member may use a client computer system to log in to the client computer system. In case of a client-server combination, the client computer system is configured to have a user account, which may be accessed by a user name and a password. Such a user account may be, for example, an account for a directory service, e.g. Active Directory, or a security account database, such as the Microsoft Windows Security Account Manager (SAM) database. In any case, the user may provide a user name and some type of key or password to identify himself or herself.

Further, a user profile will be maintained on the client computer device or on a server computer device. Such a user profile may store multiple different data types, such as files and folders specific to the user. Further, the user profile data may also include database entries which may store user-specific information, configurations or settings. One skilled in the art will be aware of the different operating systems which support user profiles, such as Microsoft Windows XP, Windows Server 2003, Windows Vista, Windows Server 2008, Unix based systems or other operating systems provided by further manufacturers.

A user login process may comprise the initiation of a session at one computer system, usually referred to as the client or client computer system. As mentioned above, during the login process a user provides authentication information such as the user name and password. The login process may further include the creation of a user environment on the client computing system based on a user profile. This user environment may consist of the background of the graphical user interface, any personalized links, icons or other functionality previously generated and stored by the user. In addition, certain personal folders may be mapped for the logged-in user.

In addition, a user log-off process as used herein includes the truncation of the session initiated during the log-in process. For example, network connections may be disconnected and/or user-specific settings which have been modified during the session may be stored back on a server as a modified or new user profile.

Moreover, as indicated above, such user profiles may be stored on a centralized server computer system. This server-stored user profile may be stored on any device in a network to be accessible from any client computer device used by the user. Depending on the number of user profiles, some enterprises employ special servers in the network, referred to herein as "profile servers". In such cases a user profile may be downloaded or copied from the profile server to the client after successful user authentication. If the user modifies or adds data stored in the profile, these modifications and/or additions are performed on the client computer system, specifically on the user profile copy currently stored on the client computer system. When the user logs off, all data of the user profile may be copied back to the profile server. In a further embodiment, only the modified data of the user profile will be sent to the profile server to maintain the newest version of the user profile on the server. Thus, the next time a user may log in at a different client computer system and will find the same environment, and will be provided with the same personal links, connected network drives and folders as during the previous session when the user was working on a different client computing system.

Referring back to FIG. 1A, at the beginning of the login process the user provides his or her user name and password, or uses another authentication method, such as a badge or chip card which stores user authentication data. In any case, the client computer system determines at step 110 whether a server-stored profile for the user exists. This determination may include the sending of a request to the network or to a particular server to determine whether a server-stored profile exists. In a different embodiment, the client may maintain a file storing information for each user who has previously logged in to the system and has requested a server-stored profile. If it is determined that no server-stored profile exists, the client computer system tries to retrieve a local profile at step 115. If no user-specific profile can be found local to the client computer system, a default user account may be used. However, the process ends after step 115 and the user may be presented with a default or user-specific computing environment.

Continuing with step 110 of FIG. 1A, if a server-stored profile exists and has been determined, the client computer device sends login information to the server computer system responsible for user sessions. For example, such a server computer system may be a profile server operating in the network to which the client computer system is connected. Further, in step 120, the server receives the login information from the client, and at step 125 evaluates the login information to obtain user profile data and corresponding metadata. In particular, in an embodiment of the present invention, the profile server includes a database storing a user profile for each user that has been created, for example, by an administrator of the network. For instance, the profile server requests user profile data by sending to a user profile store a user ID, such as the user name or information generated from the provided user name and password. In an embodiment of the invention, the user profile store may be a database.

With respect to traditional client-server systems, the complete user profile data would be sent from the profile server to the requesting client computer device. Such a user profile may consist of a plurality of files and may therefore have a tremendous amount of data which needs to be sent over the network to the client computer device. Especially in cases where the network bandwidth is low, or where the client computer device has a sparse computing power, this process of copying the user profile to the client computing device may take a while. Thus, the login process would usually be paused during the downloading time of the user profile. Depending on the size and number of files of the user profile, as well as on the network bandwidths and utilization, the login process may be paused for several seconds or even minutes. In conventional systems the copying of the data is therefore not performed simultaneously with the login process. Furthermore, most of the operating systems may wait for the completion of the user profile download, since programs and other service tasks which will be initiated during the login process depend on the user profile data.

As depicted in FIG. 1A, step 125, the server computer system of the present invention, however, evaluates the login information to obtain metadata relating to the user profile data. In an embodiment of the present invention which will be discussed in more detail below, only the metadata relating to the user profile data is sent to the client computer device. Thus, the amount of data to be transmitted is less than transmitting the total profile data. The metadata or meta information of the files of the user profile may, for example, be the name, size and date of the last modification of each file making up the user profile data. In general, the metadata may include any data describing the data or file to which it relates. For example, metadata is also known as "data about data", describing context, content and/or structure of the underlying file. In a further embodiment, the metadata may also describe the condition or origin of the underlying data.

Referring back to FIG. 1A, in one embodiment the invention may include the determination whether the login information contains an indication regarding the provision of metadata only. For example, the client computer system requesting user profile data may send the login information together with such an indication. In an embodiment, the indication may be any preset bit sequence which the server computer system can detect and interpret as an indication to provide only metadata instead of a complete user profile. If such an indication has been detected, the process of FIG. 1A follows the "yes" branch from step 130 to step 140, where the metadata of the user profile data is created. In a different embodiment, the metadata may be stored in the user profile store of the server and may be requested directly from the user profile store instead of the complete user profile data. This would further accelerate the processing time on the server site.

In a further embodiment of the present invention, the client may be configured to indicate that some files of the user profile shall always be sent to the client, while for the remaining files only metadata is requested. In such an embodiment, the server system can detect and interpret the indication to provide the corresponding files and metadata to the client.

In yet another embodiment of the present invention, the client may be configured to solely implement the method of the present invention. Such a client computer system may determine metadata of user profile data by pulling information from a conventional server. In particular, the client may subsequently request information relating to the user profile, such as the path to the user profile files, the sub-directories (if any exist) storing the profile files and/or the number of files making up the user profile data, etc. Further, the client computer system may use this information to then request information about the user profile data, e.g. the metadata relating to the user profile files. In other words, this process may be similar to calling a pull method to extract data from the user profile store or to determine file related data from a file server. The data retrieved from the user profile store or server may subsequently be used to determine, for example, the names, sizes and/or attributes of files making up the user profile, i.e. the metadata described in more detail above. Thus, with respect to FIG. 1A, functionality of the steps 125, 130 and 140 would then be performed at least in part by the client computer system instead of the server. Such a system would be advantageous in that only the client system needs to be modified, while conventional server computer systems can be used to determine the necessary meta information. Such a conventional server computer system may be, for example, a server which only provides file server functionality.

Referring back to FIG. 1A, if on the other hand, the above-mentioned indication for metadata only is not determined at step 130, the server retrieves the complete user profile data from the user profile store at step 135 and sends the complete user profile data to the client computing device. Thus, the client computing device will either receive the complete user profile data at step 136 or the metadata relating to the user profile data at step 145. In the case of step 136, i.e. receiving a complete user profile, the process ends, since the login process may continue as usual. In detail, since the complete user profile data is now available on the client computing system, a traditional login process may be performed, which is not modified in line with embodiments of the present invention.

Moreover, with respect to the above described embodiments where the client computing device has either determined or received metadata relating to the user profile data, the client computer system parses the metadata at step 146. The parsing may include determining the name, the size, format or file type or the date of the last modification for at least one of the user profile files. Based on the information identified by parsing the metadata, the process of the present invention may create at step 150 a stub in the file system of the client instead of a complete file. The stub may thus be equivalent to the "real" user profile file, in that the stub has the same name, file properties and/or attributes. Thus, a stub simulates in the file system of the client a file which may be accessed or requested by other programs or service tasks started during the login process. Using the metadata, the stub may even have the same size as the "real" user profile file, but does not include any data. In an embodiment of the invention, the stub may be created by filling the stub-file with zero data.

As will be appreciated by those skilled in the art, the above-described process of the present invention allows a faster login process, since the client computing device does not need to wait for the complete download of the user profile data. However, any program or service requesting or accessing user profile files will not raise an error, since the file system provides at least stubs which simulate the existence of the real user profile files. As will be apparent from the detailed discussion below, the present invention allows a further acceleration of the login process, by providing the login process simultaneously with the downloading of complete user profile data.

With respect now to FIG. 1B, a further embodiment will be described. After step 150 (FIG. 1A), where a stub is created for each file of the user profile data, the method of the present invention may determine at step 160 whether the file system employed on the client device supports "reparse points". In general, file systems such as NTFS, provide reparse points which may be a file or directory indicating that the file or directory is not within the same file system but refers to a different source. Thus, a file may be created in the NTFS file system which provides access to a different file lying on a different source, which may even employ a different file system. Thus, a reparse point may be used to implement a stub.

Figure 1B:
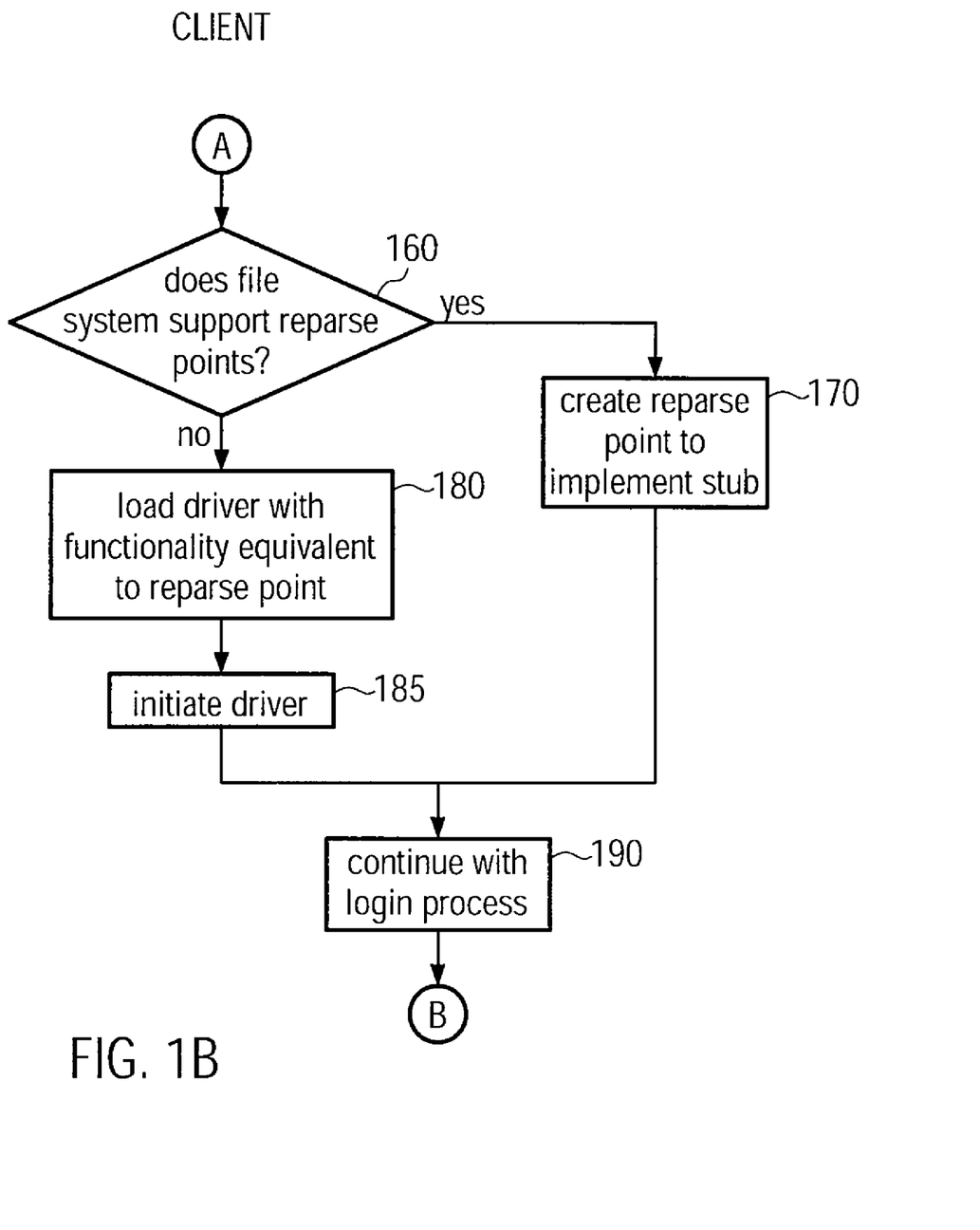
FIG. 1B is a flow chart illustrating further steps of the login process of FIG. 1A according to an embodiment of the present invention.

Continuing with FIG. 1B, if it is determined at step 160 that the file system supports reparse points, a reparse point is created to implement each stub at step 170. In a different embodiment, step 150 does not create a stub in the file system, but stores the parsed metadata which can further be used to create the reparse point. In an embodiment, the reparse point may additionally store control information. Thus, the path in the network may be stored with the reparse point pointing to the profile file stored on the profile server. Depending on the underlying file systems of the client and the server computing systems, other mechanisms may also be employed to provide the functionality of a stub or reparse point as outlined above.

If at step 160 it is determined that the file system of the client device does not support reparse points, the method of the present invention loads a driver which provides the functionality equivalent to reparse points. This driver may, in an embodiment of the present invention, implement an event which is raised for each access of a file. The driver then checks whether this file is part of the user profile data, and in particular, whether the file has not been completely downloaded yet, but is represented by metadata only. Moreover, the driver may store path and file information, for example from the metadata, to provide responses relating to attributes of the file, such as name, size or path to the user profile server. This driver allows the implementation of the present invention on any client computer device independent of the installed file system. Further, this functionality is depicted in FIG. 1B in steps 180 and 185, where the driver is loaded and initiated, respectively.

In any case, the present invention may have created a stub for each user profile file, a reparse point for each file or may have initiated a driver providing an equivalent functionality to reparse point functionality. Further, as step 190 the login process is continued.

Thus, while a traditional user login would have involved waiting for the complete download of the user profile data, the present invention performs the steps described above with respect to FIGS. 1A and 1B, which will save time during the login process. Depending on the size of the complete user profile, this may save several seconds or even minutes during the login process. The user of the client device will therefore have the impression that the login process proceeds much more quickly than with traditional client-server login systems. The user may further not recognize that the user profile has not yet been downloaded but will be downloaded while the login process continues simultaneously.

Figure 2A:
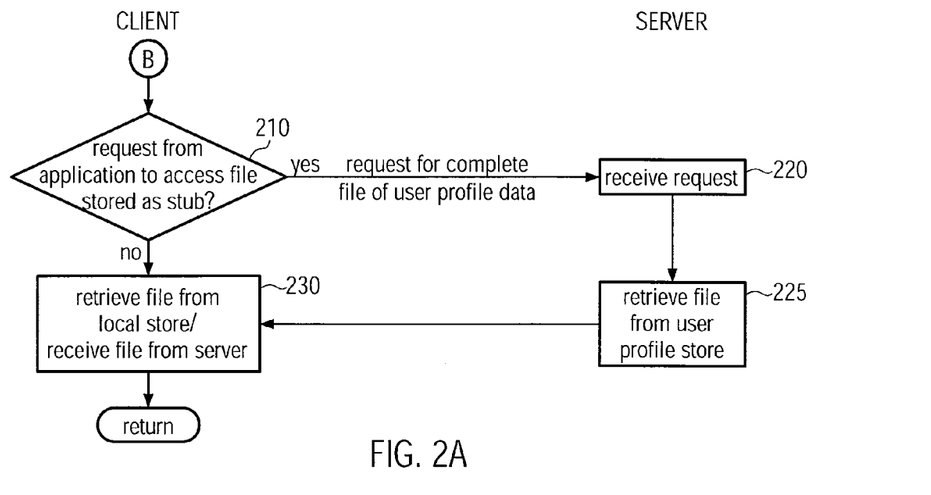
FIG. 2A is a flow chart illustrating the retrieval of requested user profile data according to an embodiment of the present invention.
Figure 2B:
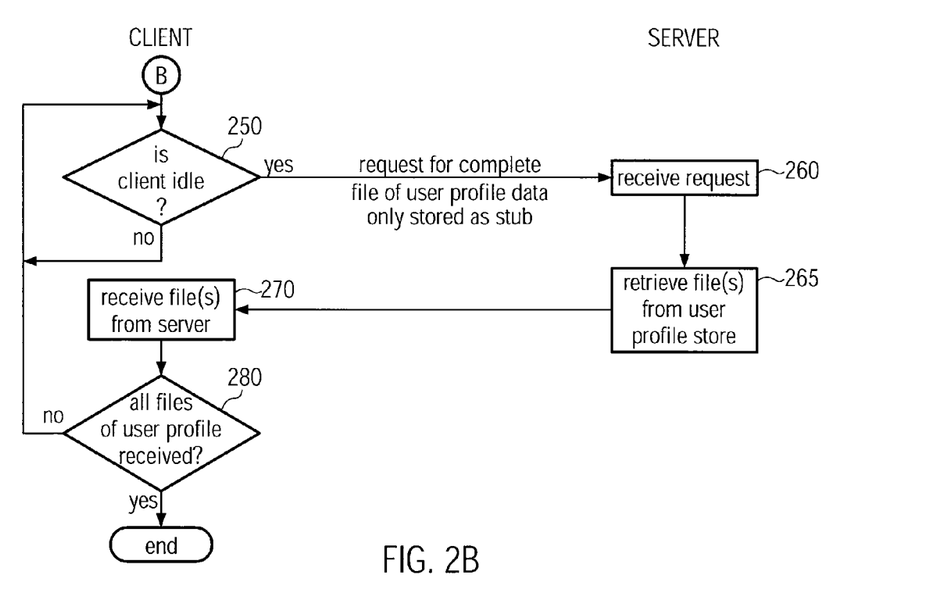
FIG. 2B is a flow chart illustrating the retrieval of remaining user profile data according to an embodiment.

Referring to FIGS. 2A and 2B, where methods are illustrated which may be performed after completion of the method steps of FIGS. 1A and 1B. In detail, FIG. 2A illustrates the process where a program application, an operating system service or other task requires access to a file of the user profile data. Thus, at step 210 it is determined whether an application requests access to a file which is stored as a stub. As outlined above with respect to FIG. 1B, the file may also be represented by a reparse point or an appropriate driver has been loaded. Thus, in these cases, it is rather determined whether a reparse point exists, or an event may have been raised by the particular driver when access to the file has been detected. In any case, if it is determined that the request relates to a file which exists on the local drive, i.e. following the "no" branch from step 210, the file will be retrieved from a local store such as the hard disc or memory of the client computer system.

On the other hand, if it is determined at step 210 that the requested file is stored as a stub (or reparse point), the client device sends a request for the complete file of the user profile data to the server computing system. At step 220, the server receives this request for a complete file and retrieves the file from the user profile store at step 225. In an embodiment of the present invention, the requested file may be identified by a globally unique identifier (GUID) which has been sent from the client to the server with the request for the file. Thus, the server may retrieve the file at step 225 from a database based on the provided GUID. Further, the server sends the retrieved file to the client computer device. In a different embodiment, the client computer system may pull the file from the server computer system using path and file information from the previously determined metadata. However, at step 230, the client has either retrieved the file from a local store or has received the requested file from the service computer system. The method of FIG. 2A then returns to the operating system process.

The application which has requested access to the file can now continue with accessing the file and processing any information relating to the requested file. Thus, the request from the application may only be paused for a short time, which may not be recognized by the user. In comparison to traditional user profile systems, the downloading time of a complete user profile may be split to multiple time units during or after the login process. A further advantage of the present invention is that only data or files need to be downloaded from the server to the client if a service or task on the client device needs access to this data. For example, if the client computing device is a personal digital assistant, the memory capacity and processing power of this device would be too small to provide a user-convenient login process on the basis of traditional user profile client-server systems. In a further embodiment, if the user only requests emails from an email server it might not be at all necessary that a complete user profile containing desktop background, desktop icons, personal links, or personal files be downloaded, or that certain network drives will be bound or mapped in the client. Thus, the amount of data which needs to be sent over the network and required processing power can be reduced to a minimum. In the case of mobile devices, this may even reduce the costs for the network connection, such as mobile telephone data connections.

With respect to FIG. 2B, a further process may be started to download a complete user profile, if necessary. Thus, at step 250, it is determined whether the client computer processor is idle. In a different embodiment, it may not be determined whether the processor is idle, but whether the remaining processes currently running on the processor are not compensating all available processor cycles. For example, in an embodiment of the present invention, the term "idle" may comprise a processor status, where a certain percentage, such as 20% or 50%, of the processor cycles are unused.

Referring back to FIG. 2B, if the client is not idle the process loops back until some processor cycles may be available to perform the method of FIG. 2B. On the other hand, this loop may also include a timer which checks for an idle processor within certain intervals, such as every 100 milliseconds or 5 seconds. On the other hand, if it is not determined that the client processor is idle for the duration of a preset time, such as one minute, the remaining process steps depicted in FIG. 2B may be forced to start. On the other hand, if no idle time can be determined, the process of FIG. 2B may stop or return, for example to the method of FIG. 2A.

However, if an idle time of the client processor is determined at step 250, a complete file or files of the user profile data, which are currently represented only by stubs or reparsed points, are requested. At step 260, the server receives the request for complete files and retrieves the file or files from the user profile store at step 265. As indicated above with respect to FIG. 2A, the request sent from the client to the server may include a globally unique identifier for the files. In a different embodiment, an index of the user profile store, if available to the client, may be sent from the client to the server to identify the requested file.

After retrieval of the files form the user profile store, the server computer system sends the at least one file to the client, which receives the at least one file at step 270. The process of FIG. 2B then determines whether all files of the user profile have been received at step 280. If there are still user profile files represented as stubs or reparse points, the process of FIG. 2B loops back to the beginning where it will again be determined whether the client processor is idle. If however, all files have been received from the server, the user profile on the client computer system is complete, and the process ends.

With respect now to FIG. 3, a logoff process will be described. As depicted at step 310, the process determines whether the user has logged off from the client computer system. If so, modified data of the user profile is sent from the client to the server computer system. In a different embodiment, it is first determined whether the user profile has been modified at all. Moreover, in a further embodiment, the complete user profile is sent to the server, independent of any modification to the user profile. At step 320, the server computer system receives the user profile and saves, at step 365, the user profile data in the user profile store.

Figure 3:
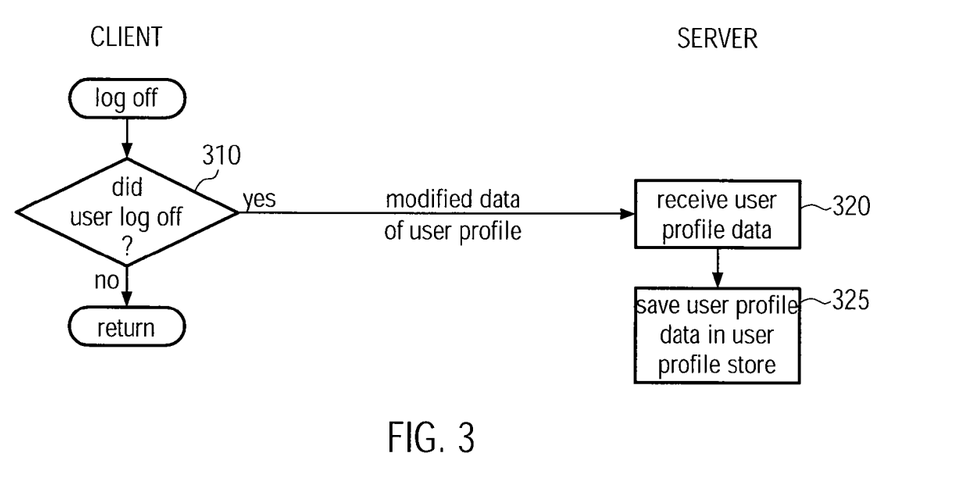
FIG. 3 is a flow chart illustrating the logoff process of a client computer system according to an embodiment of the present invention.

The above-discussed processes depicted in FIGS. 1, 2 and 3, may further be controlled by a control program provided on, for example, the client computer system. This control program may be used to preset or predefine certain attributes concerning how to handle the user profile data. For example, it may be predefined which files need to be downloaded from a user profile server, and which files may be represented as stubs. Thus, a user or administrator is given the possibility of accelerating the login process by predefining that all files will be represented as stubs and no file will be downloaded at the beginning of the login process. On the other hand, the user may set filters based on file attributes, such as read-only files, or file types, such as links, "*.doc"-files etc., the path, name or size of the files. Thus, the control program may be used to download the most frequently used user profile files at the beginning of the process, while less important files may be downloaded later on. The present invention may therefore allow to optimize the login process.

Figure 4:
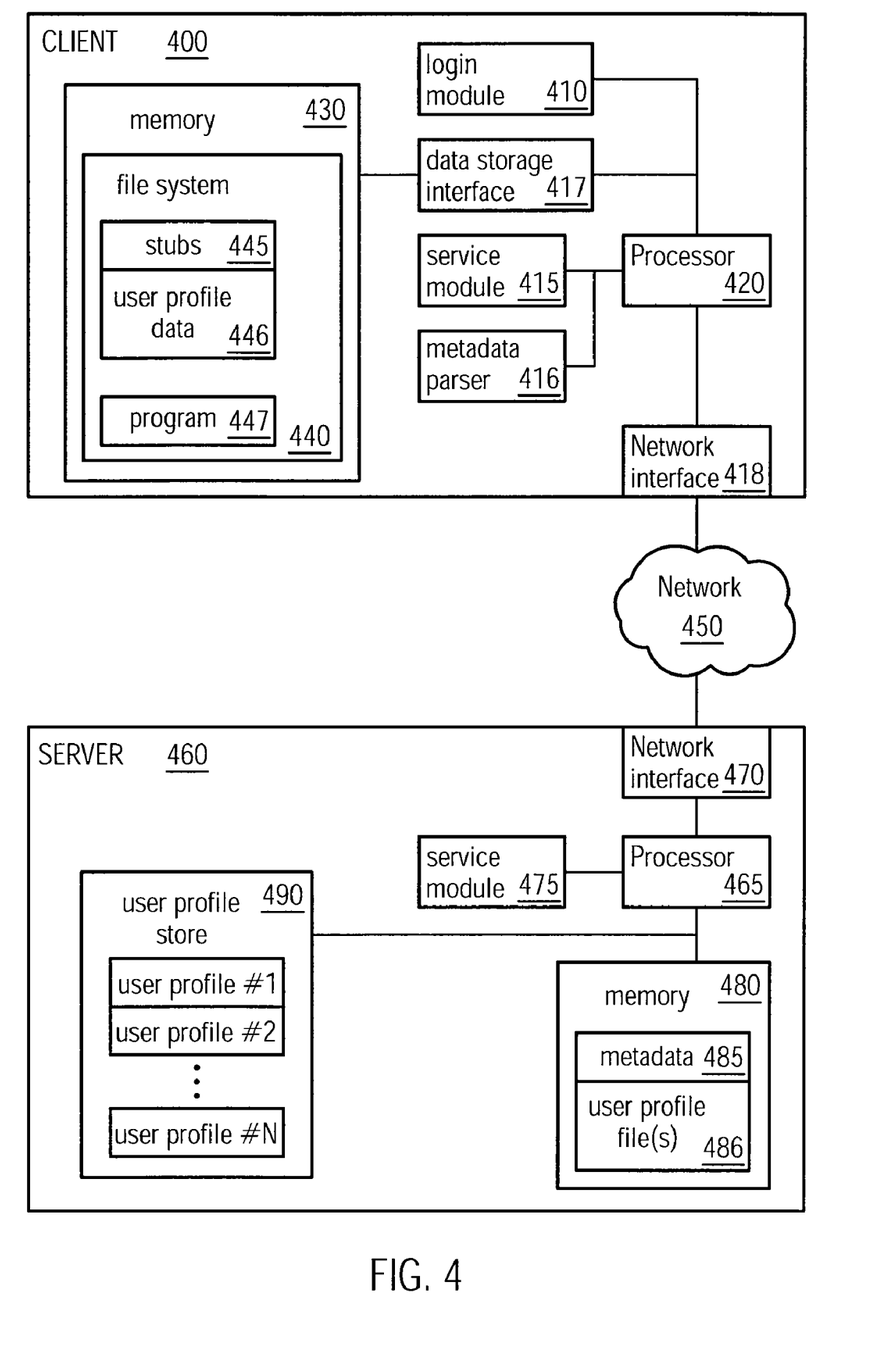
FIG. 4 is a block diagram depicting an exemplary client-server computer system in which the present invention may be implemented according to an embodiment.

Referring now to FIG. 4, a client-server system is depicted in a block diagram. FIG. 4 provides the depiction of a client computer system 400, a server computer system 460, and a network 450 which may be used to interconnect the client and server device. Both devices provide a network interface 418 and 470 which may be further used to establish a connection to the network and thus a link between the client and server computer systems. These network interfaces may be implemented as a network adaptor or network interface card known to those skilled in the art.

Further, with respect to the client computer system 400, the client further comprises a processor 420 which is coupled to a memory 430 via an appropriate interface, such as data storage interface 417. The memory 430 may be implemented as a read-only memory, random access memory or a combination of both memory types. In a further embodiment, the memory 430 is implemented as a hard disc drive providing non-volatile memory to the client computer system. In this case, the data storage interface 417 would be implemented as a hard disc drive interface.

Continuing with the description of FIG. 4, the memory 430 may have employed a file system. Those skilled in the art will be aware of different file system types. In a particular embodiment of the present invention, the file system may be the NTFS file system which may be provided by certain operating systems such as Microsoft Windows™ operating systems.

Referring back to FIG. 4, the client further provides a login module 410, a service module 415 and a metadata parser 416. These modules and the metadata parser may also be stored in memory 430 and may be loaded into a random access memory of the client device by the processor 420. The login module 410 is further configured to allow a user to log in to the client computer system and to send login information to the server computer system 460 during the login process. This login process is discussed in more detail above with respect to FIGS. 1A and 1B.

The service module 415 may be executed by the processor 420 and may also be configured to receive metadata relating to user profile data from the server computer system 460. As discussed above, the service module 415 may, in a different embodiment, pull information relating to user profile data from the server computer system 460. The service module 415 may then determine metadata relating to the user profile data. In any case, this metadata may further be parsed by the metadata parser 416. As described above with respect to FIGS. 1A and 1B, the service module may create stubs 445 in the file system based on the metadata provided by the parser 416. In addition, the service module may further be configured to request at least partial profile data from the server computer system, such as part of a user profile file which will further be stored in the file system 440 of the client. FIG. 4, for example, depicts user profile data 446 which may represent one or more user profile files or may represent only part of a user profile file downloaded from the server computer system 460.

In addition, FIG. 4 depicts a program 447, such as an application program or other service task executed by the processor. This program may request access to a user profile file which is only stored as a stub 445, and which is further discussed with respect to FIG. 2A above.

In an embodiment, where the file system 440 is the NTFS file system, the access of the program 447 to user profile data may be paused. This delaying of the file access may be done by a filter driver. For example, NTFS may support reparse points stored together with a stub in the file system 440. Thus, if the program 447 tries to access a file represented by a stub 445, the operating system will detect the reparse point stored together with the stub 445. Further, the operating system points to a filter driver which has been registered for the operation using reparse points. The indication of the operating system may be performed by a look-up in the registry to determine the filter driver for this kind of reparse point. In a different embodiment, the identification of a correct filter driver may be performed by using a so-called "tag" which was set during the creation of the reparse point. The filter driver further initiates the downloading of the user profile file (such as from "user profile #1" of user profile store 490) of the server 460. After downloading the user profile file to the client, the stub 445 will be replaced by user profile data 446 downloaded from the server 460.

In a further embodiment, the control program mentioned above may run on the client 400 and may have been used to set an attribute that only blocks of data will be downloaded from the server 460 instead of complete user profile files. Thus, the present invention may also be implemented on a block level instead of a file level. In another embodiment, the control program may be used to pre-set different forms of downloading strategies for different file types. Thus, some file types may be downloaded as complete files while other file types may be downloaded on a block level. Further, the file size may also be used as an indication as to whether a file shall be downloaded as blocks or in full. For example, it may be preset that a file having at least a certain size is to be downloaded on a block level.

Referring back to FIG. 4, the server 460 also includes a processor 465, memory 480 and a service module 475. In an embodiment, the service module 475 is executed by the processor 465 and implements the functionality of the present invention. In detail, the service module 475 may be configured to intercept requests from the client computer system and further requests user profile data from a user profile store 490 of the server 460. The service module 475, in an embodiment of the invention, determines whether the client 400 has requested for complete user profile data or metadata only. In the second case, the service module 475 may store at least one user profile file 486 in memory 480 to obtain metadata 485 of the retrieved user profile file 486. The metadata 485 or user profile file 486 may therefore be stored in memory 480 before sending it to the client 400.

Moreover, the service module 475 may be configured to detect login information provided by the client 400 which may further be used to authenticate a user login and to identify a corresponding user profile stored in the user profile store 490 (for example "User Profile #1").

Finally, in another embodiment as described above, the server computer system may not contain and run the service module 475, but is instead a conventional server system. In this embodiment the service module 415 running on the client 400 may pull information regarding the path and files of the user profile from the server 460 to then determine metadata relating to the user profile data. Moreover, the client system may subsequently pull further data of the user profile, such as complete user profile files.

While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

What is claimed is:

1. A method that, when executed on a processor of a client computer system, causes the client computer system to perform a method of loading user profile data from a server computer system to the client computer system, the method comprising:
   initiating a login process for a user on the client computer system;
   during the login process, sending login information to the server computer system;
   determining metadata relating to the user profile data;
   parsing the metadata related to the user profile data, wherein the user profile data comprises at least one file;
   creating a stub for each file of the user profile data identified by the parsed metadata; and
   determining whether a file system of the client computer system supports reparse points;
   if the file system supports reparse points, creating, for each file of a user profile, a reparse point to store at least a path to a location on the server computer system containing a file of the user profile data, and
   if the file system does not support reparse points, loading and initiating a driver simulating the functionality of reparse points.

2. The method of claim 1, wherein determining metadata further comprise pulling file information corresponding to the user profile data from the server computer system and determining the metadata from the pulled information.

3. The method of claim 1, further comprising:
   completing the login process on the client computer system without reception of the complete user profile data.

4. The method of claim 1, further comprising:
   requesting partial profile data being at least a part of the user profile data from the server computer system, if an entity running on the client computer system requires access to the partial profile data; and
   receiving the requested partial profile data from the server computer system.

5. The method of claim 1, further comprising:
   determining whether an application on the client computer system requests access to a file of the user profile data; and
   determining whether a stub exists for the requested file;
   if only a stub exists for the requested file: pausing the request; and downloading the remaining file data for the requested file from the server computer.

6. The method of claim 1, further comprising:
   downloading, from the server computer system, remaining file data for each user profile file represented by a stub.

7. The method of claim 6, further comprising:
   detecting that the client computer system is idle;
   wherein downloading remaining file data comprises downloading, from the server computer system, remaining file data for each user profile file represented by a stub while the client is idle.

8. The method of claim 1, wherein sending login information further comprises sending, to the server computer, an indication that only the metadata relating to the user profile data is to be sent, and wherein the method further comprises:
   receiving metadata relating to the user profile data from the server computer system;
   wherein determining metadata comprises determining metadata relating to the user profile data from the received metadata.

9. The method of claim 1, further comprising:
   determining whether the user is having a server-stored user profile;
   if the user is having a server-stored user profile, requesting the metadata relating to the user profile data; and
   if the user is not having a server-stored user profile, loading user profile data stored local to the client computer system.

10. The method of claim 1, further comprising:
    uploading, to the server computer system, the user profile data of the client computer system, if the user profile data has been modified on the client computer system.

11. A method that, when executed by a processor of a server computer system, causes the server computer system to perform a method of providing user profile data from the server computer system to a client computer system, the method comprising:
    receiving login information from the client computer system;
    evaluating the received login information to obtain user information corresponding to a user identified in the login information;
    finding user profile data stored on the server computer system based on the obtained user information;
    providing data relating to the user profile data to the client computer system to determine metadata relating to the user profile data, wherein the user profile data comprises at least one file;
    parsing the metadata related to the user profile data; and
    creating a stub for each file of the user profile data identified by the parsed metadata;
    wherein the client computer system determines whether a file system of the client computer system supports reparse points,
    and one of either creates a reparse point for each file of a user profile when the file system supports reparse points, and loads and initiates a driver simulating the functionality of reparse points when the file system does not support reparse points.

12. The method of claim 11, wherein evaluating the received login information further comprises determining whether the login information contains an indication to only provide metadata relating to the user profile data, and wherein the method further comprises:
  sending metadata to the client computer system, if the login information does include an indication to only provide metadata; and
  sending complete user profile data to the client computer system, if the login information does not include an indication to only provide metadata.

13. The method of claim 11, wherein the user profile data comprises at least one file, and wherein the method further comprises:
  receiving, from the client computer system, a request for at least one complete file of the user profile data; and
  sending the at least one complete file to the client computer system.

14. A client computer system for loading user profile data from a server computer system, comprising:
  a processor;
  a memory operatively coupled to the processor;
  a network interface configured to establish a connection to another computer system via a network;
  a login module configured to allow a user to log in to the client computer system, and to send login information to a server computer system during the login process; and
  a service module executed by the processor and configured to determine metadata relating to the user profile data comprising at least one file, and create a stub for each file of the user profile data identified by metadata relating to the user profile data, the metadata parsed by a metadata parser,
  the service module determining whether a file system of the client computer system supports reparse points, and
  one of either creates a reparse point for each file of a user profile when the file system supports reparse points, and loads and initiates a driver simulating the functionality of reparse points when the file system does not support reparse points.

15. The client computer system of claim 14, wherein the metadata parser executes on the client computer system to parse the received metadata relating to the user profile data.

16. The client computer system of claim 14, further comprising:
  a program, executed by the processor, configured to access partial profile data being at least a part of the user profile data;
  wherein the service module is further configured to request the partial profile data from the server computer system, and wherein the service module is further configured to receive the requested partial profile data and replace the stub with the received partial profile data.

17. A server computer system for maintaining user profile data, comprising:
  a processor;
  a memory operatively coupled to the processor;
  a network interface configured to establish a connection to another computer system via a network;
  a user profile store configured to store at least one user profile; and
  a service module executed by the processor and configured to request user profile data from the user profile store, wherein the service module is further configured to provide, via the network link, data relating to the requested user profile data to a client computer system to determine metadata relating to the user profile data,
  wherein the client computer system:
  parses the metadata relating to the user profile data, wherein the user profile data comprises at least one file,
  creates a stub for each file of the user profile data identified by the parsed metadata,
  determines whether a file system of the client computer system supports reparse points, and
  one of either creates a reparse point for each file of a user profile when the file system supports reparse points, and loads and initiates a driver simulating the functionality of reparse points when the file system does not support reparse points.

18. The server computer system of claim 17, wherein the service module is further configured to receive login information from the client computer system prior to requesting the user profile data, and wherein the service module is further configured to determine the user profile data based on the login information.

* * * * *